(12) United States Patent
Obayashi

(10) Patent No.: US 12,243,221 B2
(45) Date of Patent: Mar. 4, 2025

(54) VERIFICATION APPARATUS, METHOD OF CONTROLLING THE SAME, STORAGE MEDIUM AND PRINTING SYSTEM INCLUDING THE VERIFICATION APPARATUS

(71) Applicant: CANON KABUSHIKI KAISHA, Tokyo (JP)

(72) Inventor: Yosuke Obayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 17/542,681

(22) Filed: Dec. 6, 2021

(65) Prior Publication Data

US 2022/0198635 A1 Jun. 23, 2022

(30) Foreign Application Priority Data

Dec. 21, 2020 (JP) ................................. 2020-211561

(51) Int. Cl.
G06K 9/00 (2022.01)
G06T 3/147 (2024.01)
G06T 7/00 (2017.01)

(52) U.S. Cl.
CPC .............. G06T 7/001 (2013.01); G06T 3/147 (2024.01); *G06T 2207/30144* (2013.01)

(58) Field of Classification Search
CPC ........... G06T 7/001; G06T 2207/30144; G06T 2207/10008
See application file for complete search history.

(56) References Cited

U.S. PATENT DOCUMENTS

| | | | |
|---|---|---|---|
| 9,183,434 B2 | 11/2015 | Muraishi | |
| 9,392,140 B2* | 7/2016 | Kawano | ............... H04N 1/3878 |
| 10,510,135 B2 | 12/2019 | Obayashi | |
| 11,373,294 B2* | 6/2022 | Kailey | ................... G06T 7/001 |
| 11,379,962 B2* | 7/2022 | Mimura | ................ G06T 7/0002 |
| 2008/0181534 A1* | 7/2008 | Toyoda | ................ H04N 1/3876 |
| | | | 382/284 |
| 2013/0148863 A1 | 6/2013 | Muraishi | |
| 2020/0272844 A1* | 8/2020 | Ikeda | ..................... G06T 7/0004 |
| 2021/0303844 A1 | 9/2021 | Goda et al. | |
| 2022/0044373 A1* | 2/2022 | Taylor | ....................... G06T 5/50 |

FOREIGN PATENT DOCUMENTS

JP 2013-124868 A 6/2013

* cited by examiner

*Primary Examiner* — Molly Wilburn
*Assistant Examiner* — Aidan Keup
(74) *Attorney, Agent, or Firm* — Venable LLP

(57) ABSTRACT

A verification apparatus reads an image of a printed sheet using a plurality of imaging units to obtain image data. The verification apparatus extracts feature points of the obtained image data and determines whether a feature point of first image data obtained by a first imaging unit should be a feature point of second image data that should be obtained by another imaging unit. If so, the verification apparatus converts coordinates of the feature point of the second image data to a coordinate system of the first imaging unit, calculates a geometrical conversion parameter from the coordinates of the converted feature point and coordinates of feature points other than the converted feature point, and aligns the image data of the printed sheet and a correct image based on the geometrical conversion parameter.

7 Claims, 8 Drawing Sheets

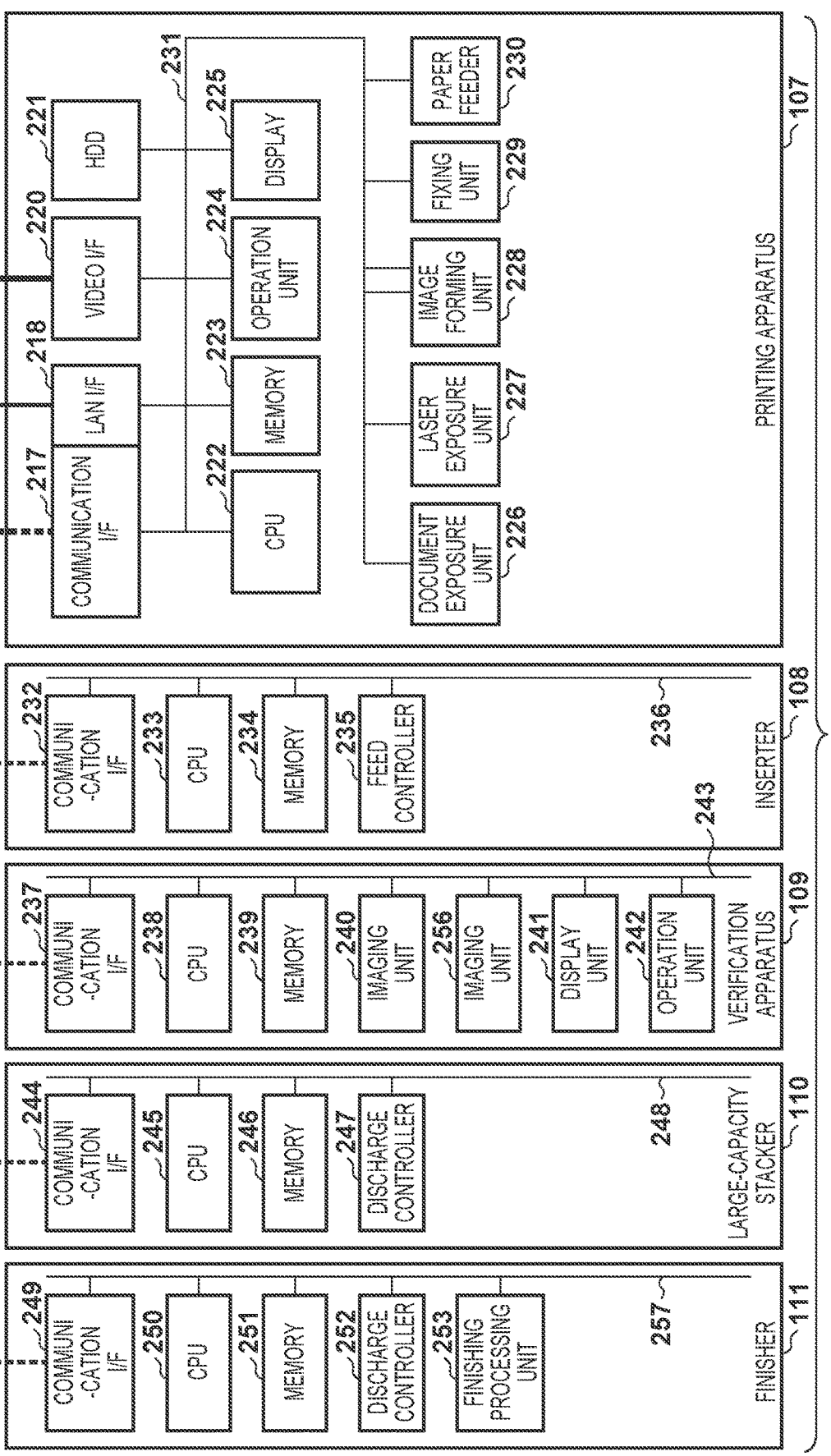

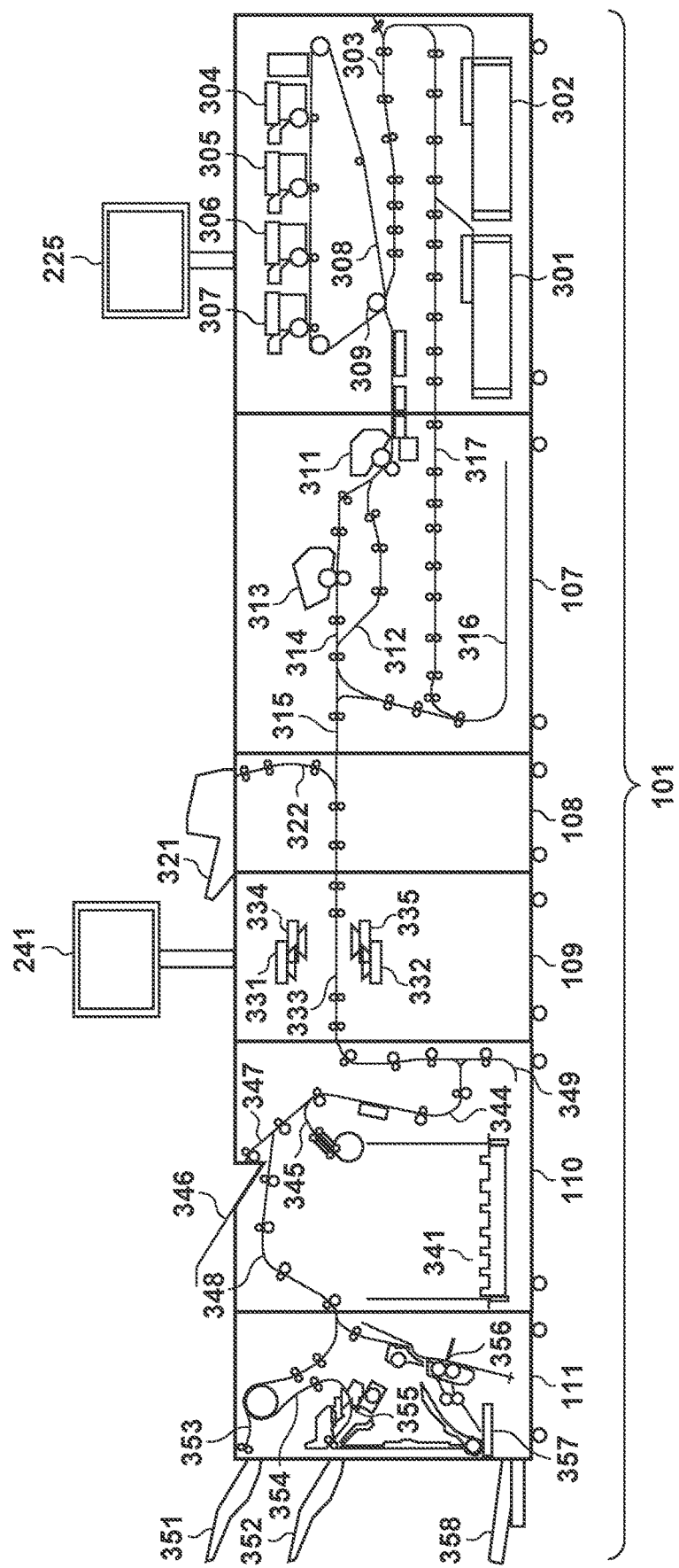

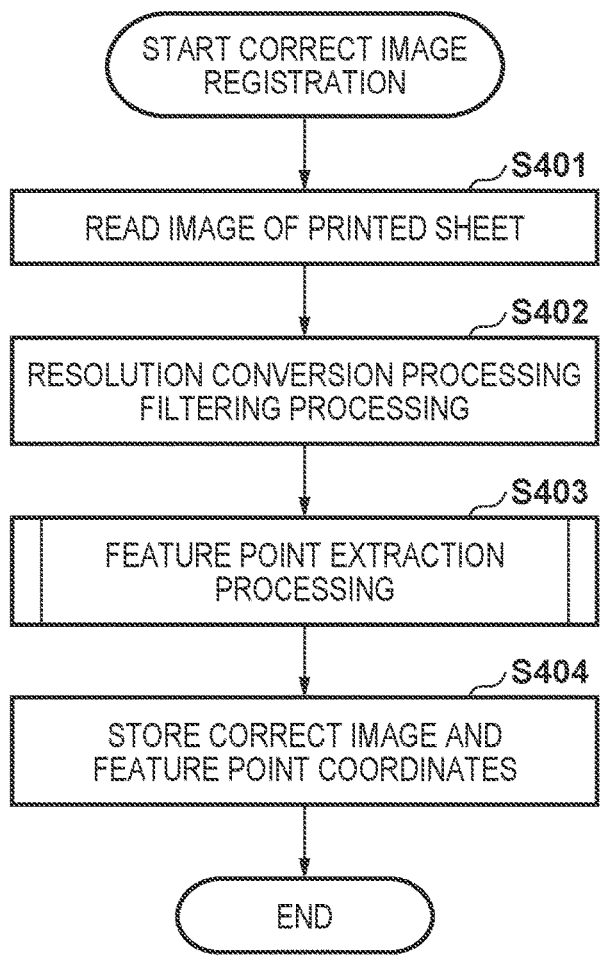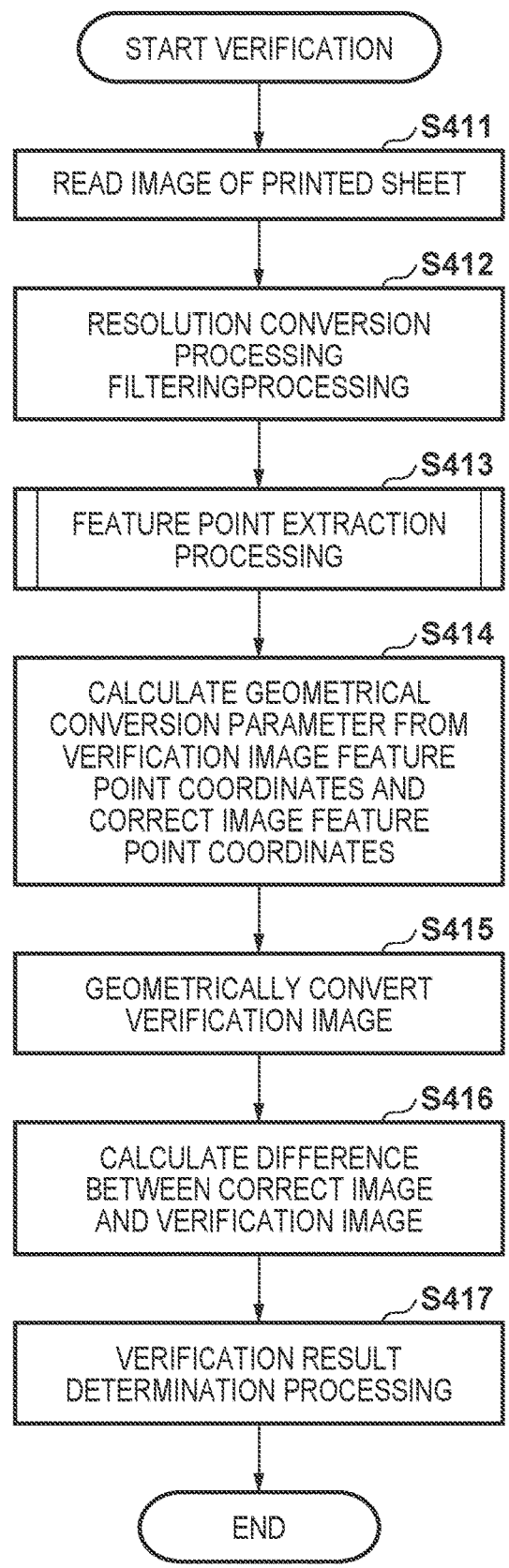

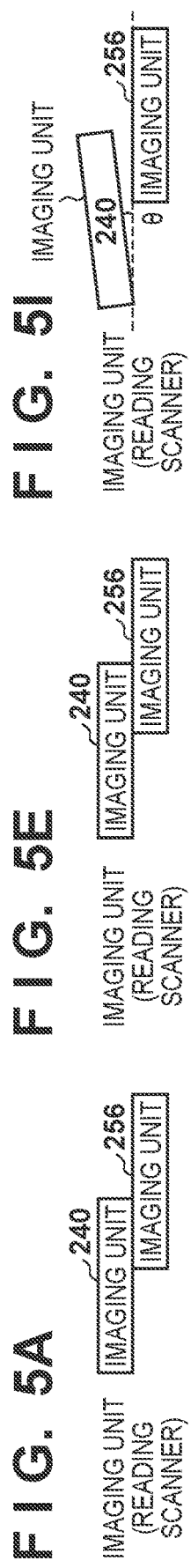
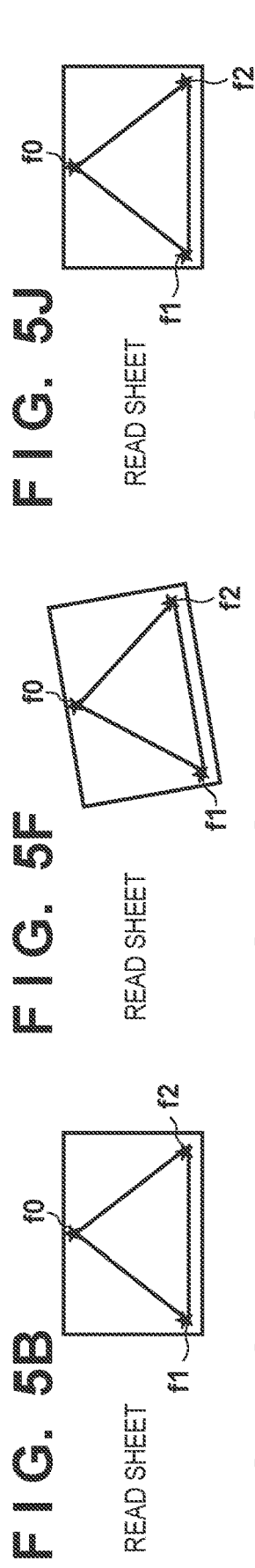
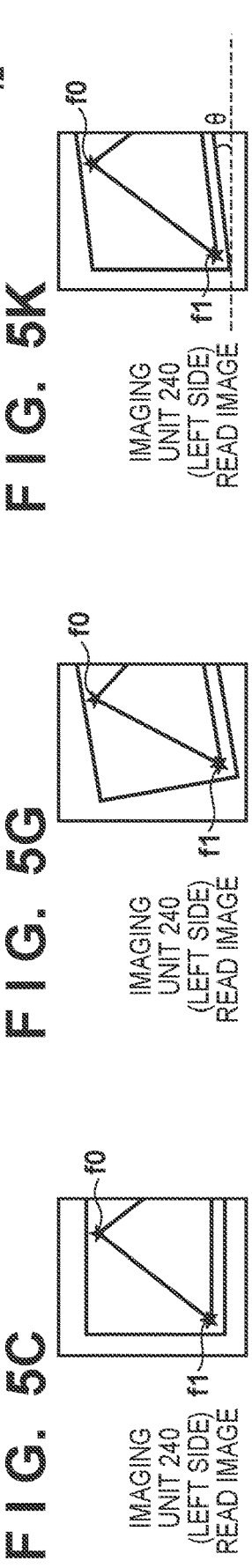
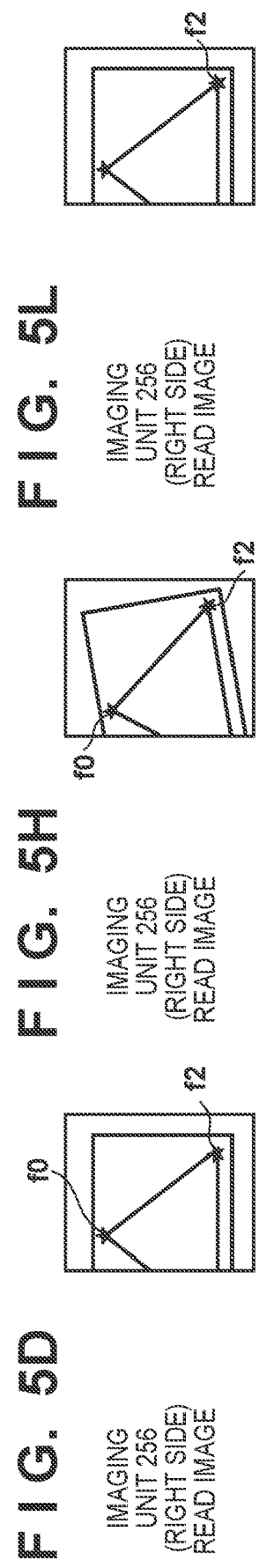

VERIFICATION APPARATUS, METHOD OF CONTROLLING THE SAME, STORAGE MEDIUM AND PRINTING SYSTEM INCLUDING THE VERIFICATION APPARATUS

BACKGROUND OF THE INVENTION

Field of the Invention

The present invention relates to a verification apparatus, a control method and a program thereof, a storage medium and a printing system including the verification apparatus.

Description of the Related Art

In recent years, there has been known a printing system capable of verifying an image printed on a sheet by a verification apparatus while the sheet printed by the printing apparatus is being conveyed. In such a verification of the printed sheet, the verification apparatus reads the image of the conveyed printed sheet, analyzes the image data obtained by the reading, and determines whether the printing image is normal or not. The verification apparatus can detect, for example, a lack of a barcode or a ruled line, missing images, printing defects, missing pages, color shifts, and the like. When it is determined that the printed sheet is defective in this manner, the defective sheet is discharged to a discharge destination different from that of the normal sheet. As a result, it is possible to prevent the defective sheet from being mixed with the normal sheet, and the operator can easily discard the defective sheet.

In the analysis of the image data described above, there is known a method of reading a printed sheet having a satisfactory quality, which has been printed in advance, by a verification apparatus, and using an image of the read printed sheet as a correct image (master image, reference image). In this method, the image of the printed sheet is compared with the correct image obtained in advance, and whether or not there is a defect in the printed sheet is detected based on whether or not there is a difference of a predetermined amount or more.

As a method of obtaining a difference from the correct image, Japanese Patent Laid-Open No. 2013-124868 describes a method of performing image alignment using image feature amount and geometrical conversion to calculate a difference between pixel values for each pixel. In this method, a plurality of points of coordinates (hereinafter, feature points) at which the image feature amount is sufficient are detected in the image, and a geometrical conversion parameter is calculated from the coordinate relationship of the feature points in the correct image and the read image. By geometrically converting using the parameter, even if positional shift, rotation, or scaling of the read image occurs due to conveyance of the sheet, the read image can be aligned with the correct image. As such geometrical conversion, affine transformation or projective transformation is used, and the calculation of each conversion parameter requires at least three or four feature points. Further, in order to accurately geometrically convert the entire read image, it is desirable that the feature points are not unevenly distributed in the printed sheet but are uniformly present across the entire sheet.

An imaging unit that reads the printed sheet in the verification apparatus may be configured by combining a plurality of small-width sensors that are smaller than the maximum sheet width conveyed by the printing apparatus. In this case, it is necessary to align, with the correct image, each of the image data that each sensor obtained by reading. However, due to the positional shift of each sensor or the unevenness of the feature points of the printed image, a number of feature points sufficient for performing the geometrical conversion of the image data that each sensor obtained may not be obtained.

SUMMARY OF THE INVENTION

An aspect of the present invention is to eliminate the above-mentioned problem with conventional technology.

A feature of the present invention is to provide a technique capable of enabling a process of aligning with a correct image even when feature points are unevenly distributed due to a positional shift of a plurality of imaging units, a tilting of a sheet, or the like.

According to a first aspect of the present invention, there is provided a verification apparatus operable to read and verify a printed sheet, the apparatus comprising: a reading unit that reads an image of the printed sheet using a plurality of imaging units to obtain image data, and at least one processor and at least one memory are configured to: extract feature points of image data obtained by reading with each of the plurality of imaging units; determine whether a feature point of first image data obtained by reading with a first imaging unit of the plurality of imaging units is a feature point of second image data that should be obtained by reading with another imaging unit; in a case where it is determined in the determining that the feature point of the first image data should be the feature point of the second image data, convert coordinates of the feature point of the second image data from a coordinate system of the other imaging unit to a coordinate system of the first imaging unit; calculate a geometrical conversion parameter from the coordinates of the feature point converted in the converting and coordinates of feature points other than the converted feature points extracted in the extracting; and align the image data of the printed sheet and a correct image based on the geometrical conversion parameter, and then obtain a difference for each pixel between the image data of the printed sheet and the correct image.

According to a second aspect of the present invention, there is provided a method of controlling a verification apparatus for reading and verifying a printed sheet, the verification apparatus having a reading unit configured to read an image of a printed sheet using a plurality of imaging units to obtain image data, the method comprising: extracting feature points of the image data obtained by reading with each of the plurality of imaging units; determining whether a feature point of first image data obtained by reading with a first imaging unit of the plurality of imaging units is a feature point of second image data that should be obtained by reading with another imaging unit; in a case where it is determined in the determining that the feature point of the first image data should be a feature point of the second image data, converting coordinates of the feature point of the second image data from a coordinate system of the other imaging unit to a coordinate system of the first imaging unit; calculating a geometrical conversion parameter from the coordinates of the feature point converted in the converting and coordinates of feature points other than the converted feature points extracted in the extracting; and aligning the image data of the printed sheet and a correct image based on the geometrical conversion parameter, and then obtaining a difference for each pixel between the image data of the printed sheet and the correct image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a block diagram for describing a hardware configuration of a printing apparatus, an inserter, a verification apparatus, a large-capacity stacker, and a finisher of an image forming apparatus according to the first embodiment.

FIG. 3 depicts an overall cross-sectional view illustrating the mechanisms of the image forming apparatus according to the first embodiment.

FIG. 4A is a flowchart for describing a process for when the verification apparatus registers a correct image according to the first embodiment.

FIG. 4B is a flowchart for describing a process for when the verification apparatus performs verification processing according to the first embodiment.

FIG. 5A to FIG. 5L are diagrams explaining a sheet conveyed by the verification apparatus, examples of images read by two imaging units, and examples of the coordinates of feature points according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined. Note that in the following description an external controller may be referred to as an image processing controller, a digital front end, a print server, a DFE, or the like. An image forming apparatus may be referred to as a multifunction peripheral or an MFP.

First Embodiment

Figure 1:
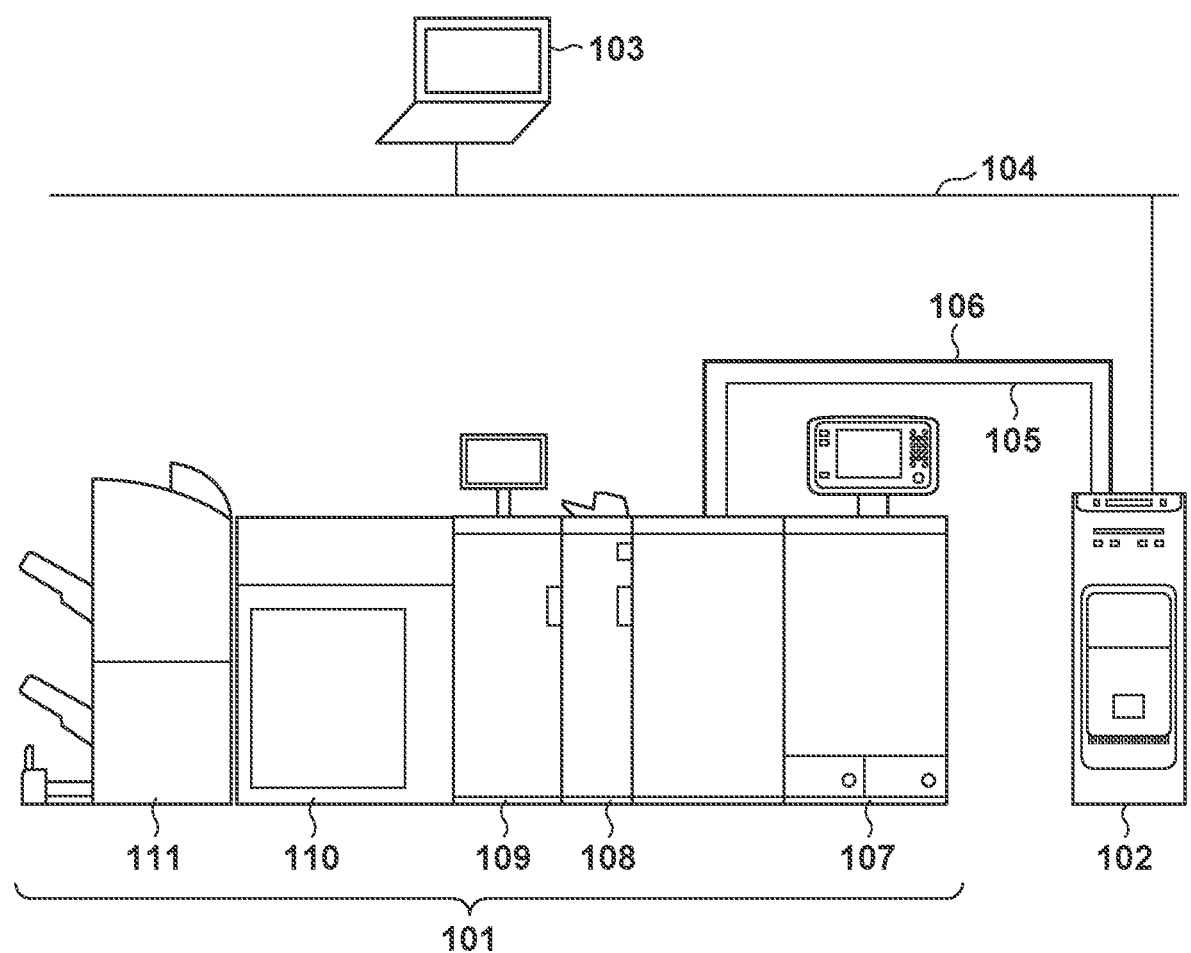
FIG. 1 is a diagram illustrating an overall configuration of a printing system according to a first embodiment of the present invention.

FIG. 1 is a diagram illustrating an overall configuration of a printing system according to a first embodiment of the present invention.

The printing system includes an image forming apparatus 101 and an external controller 102. The image forming apparatus 101 and the external controller 102 are connected to each other via an internal LAN 105 and a video cable 106 so as to be able to communicate with each other. The external controller 102 is connected to be capable of communication with a PC 103 via an external LAN 104, and a print instruction can be issued from the PC 103 to the external controller 102.

A printer driver having a function for converting print data into a print description language (e.g., a page description language (PDL)) that can be processed by the external controller 102 is installed on the PC 103. A user of the PC 103 can issue print instructions from various applications via the printer driver. In such a case, the printer driver transmits the print data to the external controller 102 based on the print instruction from the user. Upon receiving a print instruction from the PC 103, the external controller 102 performs analysis and rasterization processing of the print data to create image data for printing, inputs the image data into the image forming apparatus 101, then performs a print instruction.

Next, the image forming apparatus 101 will be described.

A plurality of apparatuses having different functions are connected to the image forming apparatus 101, which is configured to be capable of complicated printing processes such as bookbinding. A printing apparatus 107 forms (prints) an image on a sheet conveyed from a paper feeder located at a lower portion of the printing apparatus 107 using toners. The configuration and the operation principle of the printing apparatus 107 are as follows. Light rays such as laser beams modulated in accordance with the image data are reflected by a rotating polygonal mirror such as a polygonal mirror and irradiated on the photosensitive drum as scanning light. The electrostatic latent image formed on the photosensitive drum by the laser beam is developed by the toner, and the toner image is transferred to the sheet adhered to the transfer drum. A full color image is formed on a sheet by sequentially executing this series of image forming processes for yellow (Y), magenta (M), cyan (C), and black (K) toners. The sheet on the transfer drum on which the full-color images have been thus formed are conveyed to a fixing unit. The fixing unit includes a roller, a belt, and the like; a heat source such as a halogen heater is incorporated in the roller; and the toner on the sheet to which the toner image has been transferred is dissolved by heat and pressure to fix it to the sheet.

An inserter 108 can insert, at a desired position, a sheet into a group of sheets printed and conveyed by the printing apparatus 107.

A verification apparatus 109 reads the image of the conveyed sheet and compares it with a preregistered correct image to determine whether the printed image is normal or not.

A large-capacity stacker 110 is capable of stacking and storing a large number of sheets. A finisher 111 performs a finishing process on the conveyed sheet. The finishing process includes processing such as stapling, punching, saddle-stitch book binding, and the like, and the sheet bundle on which the finishing process has been performed is discharged to a discharge tray.

Although the printing system of FIG. 1 has a configuration in which the external controller 102 is connected to the image forming apparatus 101, the present invention is not limited to the configuration in which the external controller 102 is connected. That is, the configuration may be such that the image forming apparatus 101 is directly connected to the external LAN 104 and the print data is directly transmitted from the PC 103 to the image forming apparatus 101. In this case, data analysis and rasterization processing, then printing processing are performed in the image forming apparatus 101.

Figure 2A:
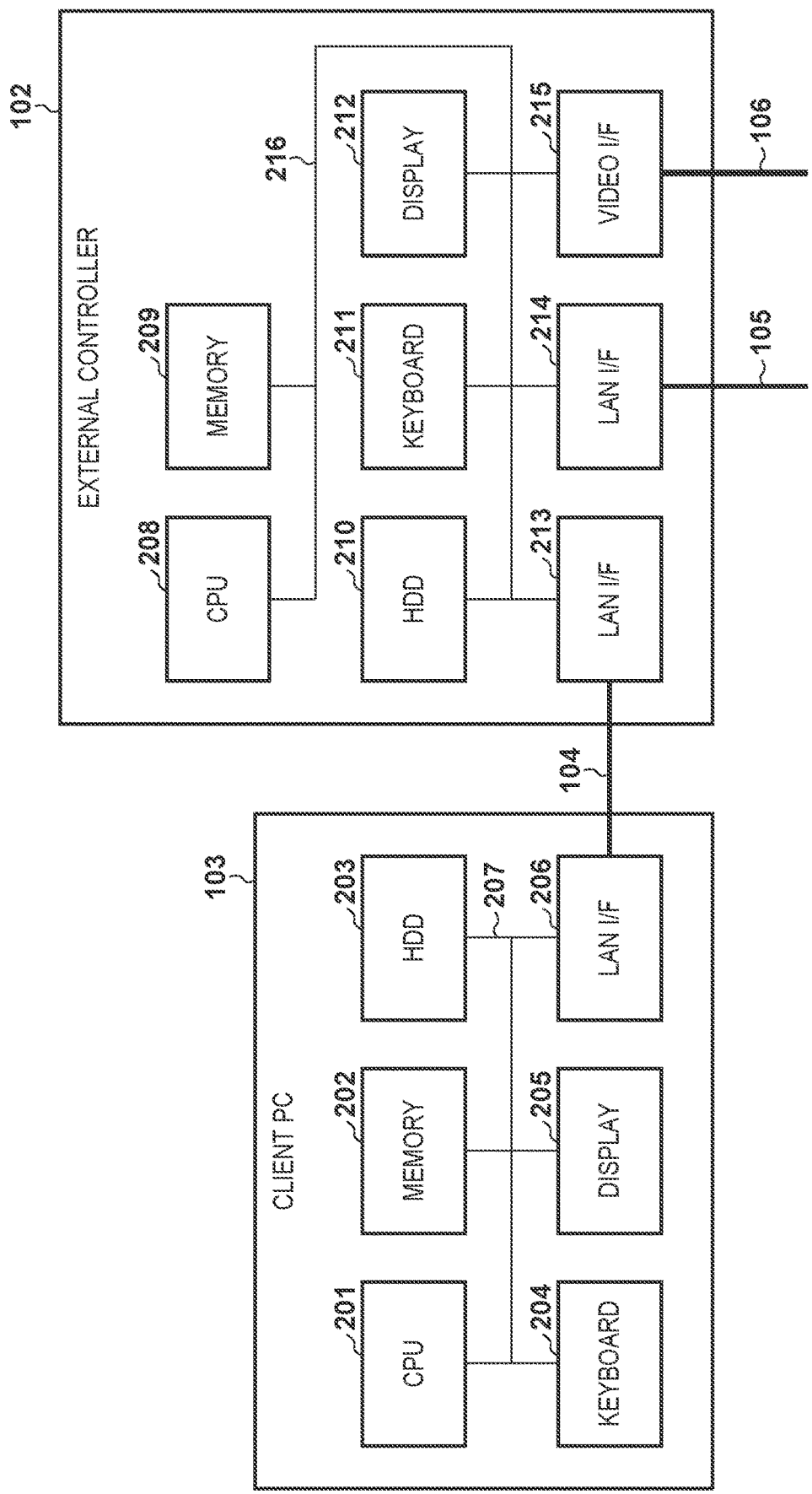
FIG. 2A is a block diagram for describing a hardware configuration of an external controller and a PC according to the first embodiment.

FIG. 2A and FIG. 2B are block diagrams for describing hardware configurations of the image forming apparatus 101, the external controller 102, and the PC 103 according to the first embodiment.

First, the configuration of the external controller 102 will be described with reference to FIG. 2A.

The external controller 102 includes a CPU 208, a memory 209, an HDD 210, a keyboard 211, a display 212, a LAN I/F (interface) 213, a LAN I/F 214, and a video I/F 215, which are connected via a bus 216. The CPU 208 deploys in the memory 209 a program stored in the HDD 210, executes the deployed program, then performs processing such as receiving print data from the PC 103, RIP processing, and transmitting print data to the image forming apparatus 101. The memory 209 has a RAM, stores programs and data required when the CPU 208 performs various processes, and operates as a work area. The HDD 210 stores programs and data required for operations such as print processing. The keyboard 211 is a device for inputting operation instructions to the external controller 102. The display 212 displays information such as an execution application of the external controller 102 by a still image or moving image video signals. The LAN I/F 213 connects with the PC 103 via the external LAN 104 and communicates a print instruction and the like. The LAN I/F 214 connects with the image forming apparatus 101 via the internal LAN 105 and communicates a print instruction and the like. The video I/F 215 connects with the image forming apparatus 101 via the video cable 106 and communicates image data and the like.

Next, the configuration of the PC 103 will be described. The PC 103 includes a CPU 201, a memory 202, an HDD 203, a keyboard 204, a display 205, and a LAN I/F 206, which are connected via a bus 207. The CPU 201 deploys in the memory 202 a document processing program stored in the HDD 203, executes the deployed program, and executes print data creation and a print instruction. The CPU 201 also comprehensively controls the devices connected to the system bus. The memory 202 has a ROM, a RAM, and the like; stores programs and data required when the CPU 201 performs various processes; and operates as a work area of the CPU 201. The HDD 203 stores programs and data required for operations such as print processing. The keyboard 204 is a device for inputting operation instructions to the PC 103. The display 205 displays information such as an execution application of the PC 103 by a still image or moving image video signals. The LAN I/F 206 connects with the external LAN 104 and communicates a print instruction and the like.

Next, the configuration of the printing apparatus 107, the inserter 108, the verification apparatus 109, the large-capacity stacker 110, and the finisher 111 of the image forming apparatus 101 will be described with reference to FIG. 2B.

The printing apparatus 107 of the image forming apparatus 101 includes a communication I/F 217, a LAN I/F 218, a video I/F 220, an HDD 221, a CPU 222, a memory 223, an operation unit 224, and a display 225. The printing apparatus 107 further includes a document exposure unit 226, a laser exposure unit 227, an image forming unit 228, a fixing unit 229, and a paper feeder 230. These components are connected via a system bus 231.

The communication I/F 217 is connected to the inserter 108, the verification apparatus 109, the large-capacity stacker 110, and the finisher 111 via a communication cable 254 and performs communication for controlling the respective devices. The LAN I/F 218 connects with the external controller 102 via the internal LAN 105 and communicates a print instruction and the like. The video I/F 220 connects with the external controller 1021 via the video cable 106 and communicates image data and the like.

The HDD 221 is a storage device in which programs and data are stored. The CPU 222 deploys in the memory 223 a program stored in the HDD 221, executes the deployed program, and comprehensively performs image processing control and print control. The memory 223 has a ROM, a RAM, and the like; stores programs and image data required when the CPU 222 performs various processes; and operates as a work area of the CPU 222. The operation unit 224 receives an input of various settings and an operation instruction from the user. The display 225 displays the setting information of the image forming apparatus 101, the processing status of a print job, and the like.

The document exposure unit 226 performs a process of reading a document when a copying function or a scanning function is used. That is, the document exposure unit 226 reads the document by capturing an image with a CCD camera while illuminating the sheet set by the user with an exposure lamp. The laser exposure unit 227 performs primary charging for irradiating the photosensitive drum with a laser beam to transfer the toner image and laser exposure. In the laser exposure unit 227, primary charging in which the surface of the photosensitive drum is charged to a uniform negative potential is first performed. Next, the laser beam is irradiated on the photosensitive drum by the laser driver while adjusting the reflection angle with the polygonal mirror. As a result, the negative electric charges of the irradiated portion are neutralized and an electrostatic latent image is formed. The image forming unit 228 is a device for transferring toner to a sheet; includes a developing unit, a transfer unit, a toner supply unit, and the like; and transfers the toner on the photosensitive drum to the sheet. In the developing unit, the negatively-charged toner from the developing cylinder is adhered to the electrostatic latent image on the surface of the photosensitive drum, visualizing the electrostatic latent image. The transfer unit performs primary transfer in which a positive potential is applied to the primary transfer roller to transfer the toner on the surface of the photosensitive drum to the transfer belt and secondary transfer in which a positive potential is applied to the transfer roller to transfer the toner on the transfer belt to the sheet. The fixing unit 229 is a device for melting and fixing the toner on the sheet to the sheet with heat and pressure and includes a heater, a fixing belt, a pressure belt, and the like. The paper feeder 230 is a device for feeding the sheet, and the operation for feeding and the operation for conveying the sheet are controlled by the rollers and various sensors.

Next, the configuration of the inserter 108 of the image forming apparatus 101 will be described. The inserter 108 of the image forming apparatus 101 has a communication I/F 232, a CPU 233, a memory 234, and a feed controller 235, which are connected via a bus 236. The communication I/F 232 is connected with the printing apparatus 107 via the communication cable 254 and performs communication required for control. The CPU 233 executes a control program stored in the memory 234 to perform various controls required for paper feeding. The memory 234 is a storage device in which the control program is stored. Based on an instruction from the CPU 233, the feed controller 235 controls the paper feeder of the inserter 108 and the feeding and conveyance of the sheet conveyed from the printing apparatus 107 while controlling the roller and the sensor.

Next, the configuration of the verification apparatus 109 of the image forming apparatus 101 will be described.

The verification apparatus 109 includes a communication I/F 237, a CPU 238, a memory 239, an imaging unit 240, an imaging unit 256, a display unit 241, and an operation unit 242, which are connected via a bus 243. The communication I/F 237 is connected with the printing apparatus 107 via the communication cable 254 and performs communication required for control. The CPU 238 executes a control program stored in the memory 239 to perform various controls required for verification. The memory 239 has a ROM and a RAM and stores a control program and the like. It is preferable that the memory 239 has a large-capacity rewritable non-volatile memory for registering a correct image in a non-volatile manner. Based on an instruction from the CPU 238, the imaging unit 240 and the imaging unit 256 capture the conveyed sheet and read the image printed on the sheet. The CPU 238 compares the image data obtained by capturing with the imaging unit 240 and the imaging unit 256 with the correct image stored in the memory 239 and determines whether or not the printed image is normal. The display unit 241 displays a verification result, a setting screen, and the like. The operation unit 242 is operated by the user and receives an instruction to change the setting of the verification apparatus 109, register a correct image, or the like.

The verification apparatus 109 according to the first embodiment captures the conveyed sheet, two imaging units 240 and 256 capturing the left side of the sheet and the right side of the sheet, respectively. In the configuration of FIG. 3 to be described later, two cameras 331 and 334 are arranged, and these correspond to the imaging unit 240 and the imaging unit 256, respectively. A specific example will be described later.

Next, the configuration of the large-capacity stacker 110 of the image forming apparatus 101 will be described.

The large-capacity stacker 110 has a communication I/F 244, a CPU 245, a memory 246, and a discharge controller 247, which are connected via a bus 248. The communication I/F 244 is connected with the printing apparatus 107 via the communication cable 254 and performs communication required for control. The CPU 245 executes a control program stored in the memory 246 to perform various controls required for paper discharging. The memory 246 has a ROM, a RAM, and the like and stores a control program and the like. Based on an instruction from the CPU 245, the discharge controller 247 conveys the conveyed sheet to the stack tray, the escape tray, or the subsequent finisher 111.

Next, the configuration of the finisher 111 of the image forming apparatus 101 will be described.

The finisher 111 has a communication I/F 249, a CPU 250, a memory 251, a discharge controller 252, and a finishing processing unit 253, which are connected via a bus 257. The communication I/F 249 is connected with the printing apparatus 107 via the communication cable 254 and performs communication required for control. The CPU 250 executes a control program stored in the memory 251 to perform various controls required for finishing and paper discharging. The memory 251 has a ROM, a RAM, and the like and stores a control program and the like. The discharge controller 252 controls conveyance and discharge of the sheet based on an instruction from the CPU 250. The finishing processing unit 253 performs the finishing process such as stapling, punching, saddle-stitch book binding, based on an instruction from the CPU 250.

In the above description, the external controller 102 and the image forming apparatus 101 are connected to each other via the internal LAN 105 and the video cable 106 but need only be configured to be capable of transmitting and receiving data required for printing, such as a configuration in which they are connected only via the video cable 106. In addition, each of the memory 202, the memory 209, the memory 223, the memory 234, the memory 239, the memory 246, and the memory 251 need only be a storage device for holding data and a program. For example, configuration may be taken where each has been replaced by a volatile RAM, a non-volatile ROM, a built-in HDD, an external HDD, a USB memory, or the like.

FIG. 3 depicts an overall cross-sectional view illustrating a mechanism of the image forming apparatus 101 according to the first embodiment.

First, the printing apparatus 107 will be described. Paper feed decks 301 and 302 can accommodate a plurality of various sheets. Each paper feed deck separates and conveys the uppermost sheet of the accommodated sheets to a sheet conveyance path 303. To form a color image, developing stations 304 to 307 form toner images using Y, M, C, and K colored toners, respectively. The toner image thus formed is primary transferred to an intermediate transfer belt 308. The intermediate transfer belt 308 is driven to rotate clockwise in FIG. 3, and the toner image is transferred to the sheet conveyed from the sheet conveyance path 303 at a secondary transfer position 309. The display 225 displays information for the printing status and setting of the image forming apparatus 101. A fixing unit 311 fixes the toner image on the sheet to the sheet. The fixing unit 311 includes a pressure roller and a heating roller, and by the sheet to which the toner image is transferred passing between the rollers, the toner is melted and pressure bonded and the toner image becomes fixed to the sheet. The sheet that has passed through the fixing unit 311 is conveyed to a conveyance path 315 through a sheet conveyance path 312. When further melting and pressure bonding are required for fixing depending on the type of sheet, the sheet that has passed through the fixing unit 311 is conveyed to a second fixing unit 313 via the upper sheet conveyance path. The sheet subjected to additional melting and pressure bonding in the second fixing unit 313 is then conveyed to the conveyance path 315 through a sheet conveyance path 314. When the image forming mode is double-sided, the sheet after fixing is conveyed to a sheet reversing path 316; the sheet reversing path 316 reverses the front and back of the sheet which then is conveyed to a double-sided conveyance path 317; and the image is transferred to the second side of the sheet at the secondary transfer position 309.

Next, a configuration of the inserter 108 for inserting a sheet will be described.

The inserter 108 includes an inserter tray 321 and causes the sheets fed through a sheet conveyance path 322 to join the conveyance path 315. As a result, it becomes possible to insert a sheet at a desired position in a series of sheets conveyed from the printing apparatus 107, then convey the sheets to a succeeding apparatus.

The sheet that has passed through the inserter 108 is conveyed to the verification apparatus 109. Inside the verification apparatus 109, the cameras 331 and 334, 332 and 335 are arranged in a form in which they are facing each other. The cameras 331 and 334 are cameras for reading the top surface of the sheet, and the cameras 332 and 335 are cameras for reading the bottom surface of the sheet. The verification apparatus 109 reads an image of the sheet using the cameras 331 and 334, and 332 and 335 at a timing when the sheet conveyed to a sheet conveyance path 333 reaches a predetermined position, then can determine whether or not the image printed on the sheet is normal. The display unit 241 displays results of verifications performed by the verification apparatus 109 and the like.

Next, a configuration of the large-capacity stacker 110 on which a large number of sheets can be stacked will be described.

The large-capacity stacker 110 has a stack tray 341 as a tray on which sheet are stacked. A sheet that has passed through the verification apparatus 109 is inputted to the large-capacity stacker 110 through a sheet conveyance path 344. The sheet is stacked on the stack tray 341 from the sheet conveyance path 344 through a sheet conveyance path 345. The large-capacity stacker 110 also has an escape tray 346 as a discharge tray. The escape tray 346 is a discharge tray used for discharging a sheet determined to be a defective sheet by the verification apparatus 109. When discharging the sheet to the escape tray 346, the sheet is conveyed from the sheet conveyance path 344 to the escape tray 346 via a sheet conveyance path 347. When conveying the sheet to a post-processing apparatus downstream of the large-capacity stacker 110, the sheet is conveyed through a sheet conveyance path 348. A reversing unit 349 is a mechanical unit for reversing the front and back of the sheet. The reversing unit 349 is used for when stacking sheets on the stack tray 341. When stacking the sheets on the stack tray 341 such that the direction of the inputted sheet and the direction of the sheet at the time of output are the same, the sheet is reversed once in the reversing unit 349. When conveying the sheet to the escape tray 346 or a subsequent post-processing apparatus (finisher 111), the sheet is discharged as is without flipping it at the time of stacking, so the reversal operation of the sheet by the reversing unit 349 is not performed.

The finisher 111 can perform post-processing on the conveyed sheet in accordance with the function specified by the user. More specifically, the finisher 111 has a finishing function such as stapling (binding at one place or two places), punching (two holes or three holes), and saddle stitch bookbinding. The finisher 111 includes two discharge trays 351 and 352, and the sheet bundle on which the finishing process is not to be performed is outputted to the discharge tray 351 via a sheet conveyance path 353. When the finishing process such as stapling is performed, the fed sheet is sent to a processing unit 355 via a sheet conveyance path 354, the finishing function specified by the user is executed, and the sheet is outputted to the discharge tray 352. The discharge trays 351 and 352 can each be moved up and down, making it possible to move down the discharge tray 351 and stack on the discharge tray 351 the sheets on which the finishing process has been performed by the processing unit 355. When the saddle stitch bookbinding is designated, a saddle stitching processing unit 356 performs stapling processing on the center of the sheet bundle, and thereafter, the sheet bundle is folded in two and outputted to a saddle stitch bookbinding tray 358 via a sheet conveyance path 357. The saddle stitch bookbinding tray 358 has a conveyor-belt configuration and is configured such that the saddle stitch bookbinding bundle stacked on the saddle stitch bookbinding tray 358 is conveyed to the left side of FIG. 3.

FIG. 4A is a flowchart for describing a process for when the verification apparatus 109 registers a correct image according to the first embodiment. The process illustrated in the flowchart is achieved by the CPU 238 of the verification apparatus 109 executing the above-described program deployed in the memory 239.

First, in step S401, the CPU 238 reads the conveyed sheet (printed sheet) with the imaging units 240 (camera 331) and 256 (camera 334) and stores in the memory 239 the image data obtained by the reading. Next, the process proceeds to step S402, and the CPU 238 performs various kinds of image processing (resolution conversion and filtering in the first embodiment) as appropriate on the stored image data. Next, the process proceeds to step S403, and the CPU 238 performs the process for extracting the feature points of the image data. In this feature point extraction process, feature points are extracted based on various feature amount calculation algorithms (such as Harris Corner Detection, Fast Corner Detection, and AKAZE). Details of the feature point extraction process will be described later. The process proceeds to step S404, and the CPU 238 stores, as a correct image in the memory 239, each of the read image data stored in the memory 239 and the coordinates of the feature points extracted in step S403, then terminates the process.

FIG. 4B is a flowchart for describing a process for when the verification apparatus 109 performs verification processing according to the first embodiment. The process illustrated in the flowchart is achieved by the CPU 238 of the verification apparatus 109 executing the above-described program deployed in the memory 239.

First, in step S411, the CPU 238 reads the conveyed sheet (printed sheet to be verified) with the imaging units 240 and 256 and stores in the memory 239 the image data (image data to be verified) obtained by the reading, similarly to step S401. Next, the process proceeds to step S412, and the CPU 238 performs various kinds of image processing (resolution conversion and filtering in the first embodiment) as appropriate on the image data stored in the memory 239, similarly to step S402. Next, the process proceeds to step S413, and the CPU 238 extracts the feature points of the image data, similarly to step S403. Next, the process proceeds to step S414, and the CPU 238 calculates a geometrical conversion parameter for aligning the read image data with the correct image based on the coordinates of the feature points of the image data to be verified extracted in step S413 and the coordinates of the feature points of the correct image extracted and registered in step S403. Here, assuming that the coordinate matrix of the feature points of the image data to be verified is a matrix A, the coordinate matrix of the feature points of the correct image is a matrix B, and the geometrical conversion parameter is a matrix X, the geometrical conversion for alignment is expressed by the following Equation (1).

$$A \cdot X = B \qquad \text{Equation (1)}$$

Assuming that the pseudo-inverse matrix of the matrix A is $A^{-1}$, the geometrical conversion parameter matrix X is expressed by the following Equation (2).

$$X = A^{-1} \cdot B \qquad \text{Equation (2)}$$

The geometrical conversion parameter is calculated by this Equation (2).

Next, the process proceeds to step S415, and the CPU 238 aligns the image data to be verified with the correct image by geometrically converting it using the geometrical conversion parameter calculated in step S414. Next, the process proceeds to step S416, and the CPU 238 obtains for each pixel the difference in the pixels between the correct image and the image data to be verified. Then, the process proceeds to step S417, and the CPU 238 determines the verification result based on the maximum value of difference between the pixels. That is, here, if the maximum value of the pixel difference is equal to or greater than the threshold value (equal to or greater than the predetermined value), it is determined that the image data to be verified is defective, that is, the sheet on which the image has been printed is a defective (abnormal) sheet, then displays that on the display unit 241, for example. When the maximum value of the difference between the pixels is smaller than the threshold value, it is determined that the sheet is a normal sheet.

FIG. 5 is a diagram for describing examples of the sheet conveyed by the verification apparatus 109 and an image read by the imaging unit 240 and the imaging unit 256 and examples of the coordinates of the feature points according to the first embodiment. In FIG. 5, it is assumed that the sheet is conveyed in a direction from the lower side to the upper side in FIG. 5 in relation to the imaging units 240 and 256.

FIGS. 5A, 5E, and 5I illustrate examples of arrangement of the imaging unit 240 and the imaging unit 256. Here, the imaging unit 240 is arranged to read the left side of the sheet to be read that is being conveyed, and the imaging unit 256 is arranged to read the right side of that sheet. The imaging unit 240 and the imaging unit 256 reads an image with an overlapping region where the image is read in an overlapping manner. The overlapping region is between the left end of an imaging area of the imaging unit 256 and right end of an imaging area of the imaging unit 240. The overlapping region needs to overlap across a sufficient region in consideration of the shift in the conveyance of the sheet.

FIGS. 5B, 5F, and 5J illustrate examples of images of sheets to be read.

FIGS. 5C, 5G, and 5K illustrate examples of images read by the imaging unit 240 in which only the left side of the sheet has been read. FIGS. 5D, 5H, and 5L illustrate examples of images read by the imaging unit 256 in which only the right side of the sheet has been read. At the time of registering the correct image, the CPU 238 registers, as the correct image in the memory 239, the image data obtained by reading the image to be read with the imaging unit 240 and the imaging unit 256. At the time of the verification process, the CPU 238 compares with the correct image registered in the memory 239 the image data obtained by reading with the imaging unit 240 and the imaging unit 256.

When the two imaging units 240 and 256 are mounted perpendicular to the conveying direction of the sheet as in FIG. 5A and the sheet is conveyed perpendicular to the imaging units as in FIG. 5B, ideally the image data obtained by reading with the respective imaging units 240 and 256 is read without any deformation. When the printed image on the sheet has three feature points, f0, f1, and f2, the feature points f0 and f1 are read by the imaging unit 240 and the feature points f0 and f2 are read by the imaging unit 256 as illustrated in FIGS. 5C and 5D.

Next, in a case where the two imaging units 240 and 256 are mounted perpendicular to the conveying direction of the sheet as in FIG. 5E, but the sheet is conveyed in a state in which it is tilted relative to the imaging units as in FIG. 5F is considered. In this case, the image data read in a state in which the image is rotated by the amount by which the sheet is tilted is obtained as in FIGS. 5G and 5H.

Next, in a case where the imaging unit 240 is mounted tilted relative to the conveying direction of the sheet as in FIG. 5I, but the sheet is conveyed perpendicularly relative to the imaging units as in FIG. 5F is considered. In this case, image data read in a state in which an image on the left side of the sheet is deformed (sheared) into a shape of a parallelogram by a tilt angle of the imaging unit 240 is obtained as in FIGS. 5K and 5L.

As described above, the image data obtained by reading with the imaging units is deformed in accordance with the conveyance state (angle, main scanning position) of the sheet and the mounting state (offset position, angle) of the imaging units. When the affine transformation is used as the geometrical conversion for aligning with the correct image such deformed read image data, at least three feature points are required. However, depending on the conveyance state of the sheet or the mounting state of the imaging units, there may be cases where the feature points required for affine transformation as illustrated in FIGS. 5C and 5D, for example, cannot be obtained from the image data obtained by reading with the imaging units.

Therefore, in the first embodiment, in order to calculate the geometrical conversion parameter for the image read by the imaging unit 240, the coordinates of the feature point f2 read by the imaging unit 256 are converted, then used. Similarly, in order to calculate the geometrical conversion parameter for the image read by the imaging unit 256, the coordinates of the feature point f1 read by the imaging unit 240 are converted, then used. This coordinate conversion will be described with reference to FIG. 6.

Figure 6:
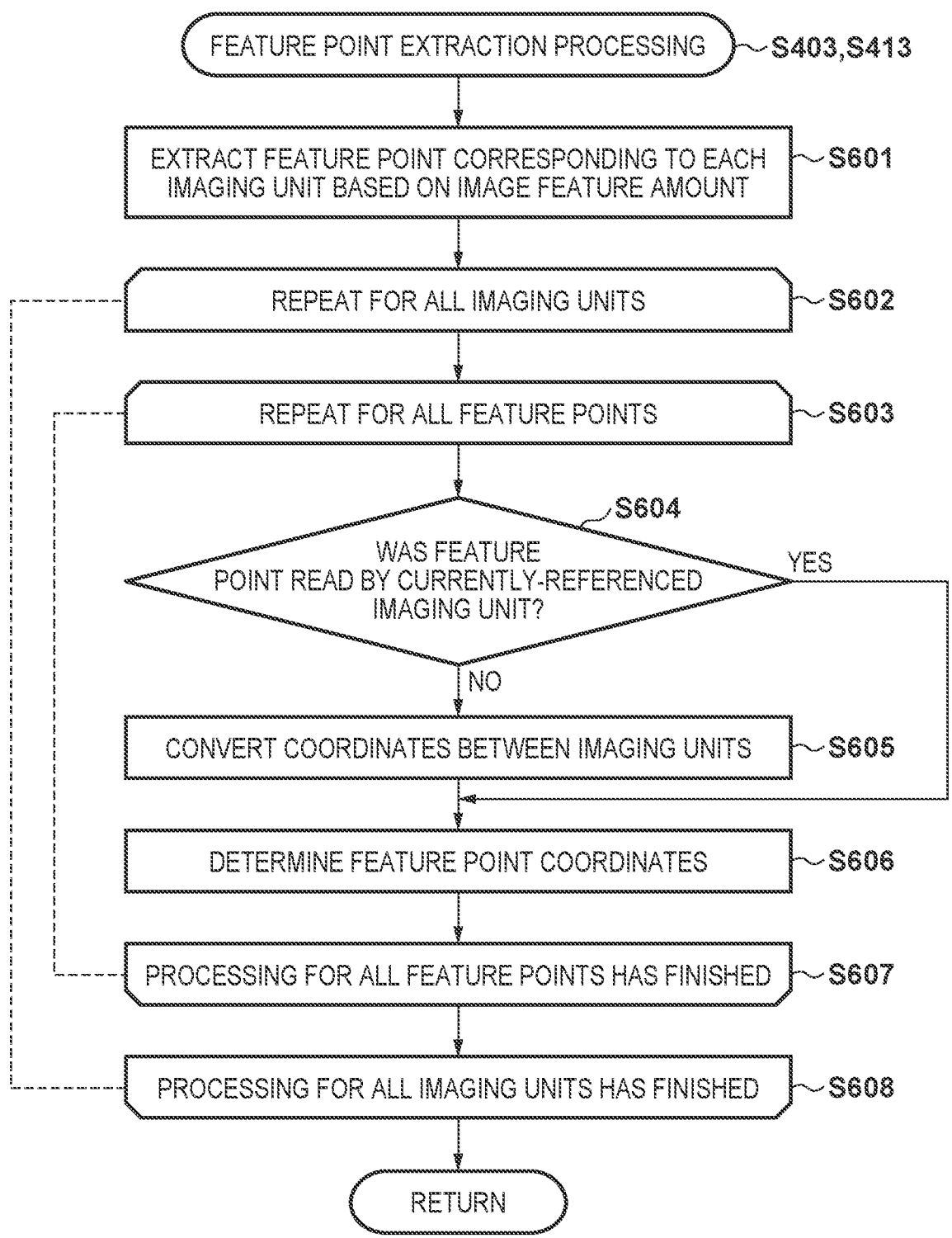
FIG. 6 is a flowchart for describing a process of extracting feature points in steps S403 and S413 of FIG. 4 by the verification apparatus according to the first embodiment.

FIG. 6 is a flowchart for explaining a process of extracting feature points in steps S403 and S413 of FIG. 4 by the verification apparatus 109 according to the first embodiment. The process described in the flowchart is achieved by the CPU 238 of the verification apparatus 109 executing the program deployed in the memory 239. This processing extracts feature points of the read image data for each imaging unit based on the feature amount calculation algorithm.

First, in step S601, based on a feature amount calculation algorithm, the CPU 238 extracts for each imaging unit feature points of an image corresponding to each imaging unit based on a feature amount of image data obtained by capturing with each imaging unit. Next, in step S602, the CPU 238 repeats the subsequent processes for all the imaging units. Here, all the imaging units refer to two imaging units 240 and 256 in the first embodiment, but the number of the imaging units is not limited to two. Then, in step S603, the CPU 238 repeats the subsequent processes for all feature points extracted in step S601. Incidentally, in the example of the FIG. 5C and the FIG. 5D, all the feature points represent the feature points f0 and f1 of the image data obtained by the imaging unit 240 and the feature points f0 and f2 of the image data obtained by the imaging unit 256. Note that the feature point f0 is read in an overlapping manner by the imaging units 240 and 256, but in the flowchart of FIG. 6, the processing is performed distinguishing the overlapped feature points as different feature points.

Next, the process proceeds to step S604, and the CPU 238 determines whether or not the feature point currently being referred to has been read by the imaging unit currently being referred to. As an example, when the imaging unit currently being referred to is the imaging unit 240 and the feature point currently being referred to is the feature point f2 read by the imaging unit 256, the determination will be false and the process proceeds to step S605. On the other hand, in the case of the feature points f0 and f1 read by the imaging unit 240, the determination will be true and the process proceeds to step S606. In this way, if the feature point is not read by the currently-referred imaging unit, the process proceeds to step S605, and the CPU 238 performs a coordinate conversion process of the feature points between the imaging units.

This, in the example of the FIGS. 5K and 5L, is a process of mapping the feature point f2 read by the imaging unit 256 to the read image data of the imaging unit 240. In other words, it is assumed that the feature point f2 which the imaging unit 240 should not be able to read could be read by the imaging unit 240. The process, in such a case, converts the coordinates of the feature point f2 from the coordinate system of the read image data of the imaging unit 256 to the coordinate system of the imaging unit 240. This mapping can also be done using geometrical conversion. The geometrical conversion parameter necessary for the coordinate conversion process of the feature points is obtained by obtaining the relative attachment positions and angles of the imaging unit 240 and the imaging unit 256 by passing a chart image or the like in advance. Incidentally, the parameter for coordinate conversion from the imaging unit 240 to the imaging unit 256, the parameter for coordinate conversion from the imaging unit 256 to the imaging unit 240 is separate from each other. Here, the parameter of the imaging unit 240 for correcting the difference in the attachment position of the imaging unit 256 is assumed to be measured at the time of shipping, then stored in the verification apparatus 109.

The process proceeds to step S606, and the CPU 238 determines the coordinates of the obtained feature points. Then, in step S607, the CPU 238 determines whether or not the repetitive process has been completed for all the feature points and if not, returns to step S603. When the process for all the feature points has been completed in this manner, the process proceeds to step S608, the CPU 238 determines whether the repetitive process has been completed for all the imaging units, and if not, returns to step S602.

As described above, according to the first embodiment, even in a verification apparatus for aligning with a correct image each image data obtained by reading with the plurality of imaging units, it becomes possible to calculate a geometrical conversion parameter by converting the coordinates of the feature points read by the respective imaging units. As a result, even if feature points are unevenly distributed in image data obtained by reading a printed sheet, it is possible to perform alignment processing by geometrical conversion.

Second Embodiment

In the above-described first embodiment, the coordinate conversion process of the feature points in steps S604 to S606 was performed for all the feature points of the image data obtained by the respective imaging units. However, depending on the printed image, a sufficient number of feature points required for geometrical conversion may be read in one imaging unit. In this case, from the viewpoint of processing speed, a configuration is conceivable in which the process of determining the coordinates of the feature points between the imaging units is omitted. This will be explained as a second embodiment. The configuration and the like of the system according to the second embodiment are the same as those of the first embodiment described above, and therefore description thereof will be omitted.

Figure 7:
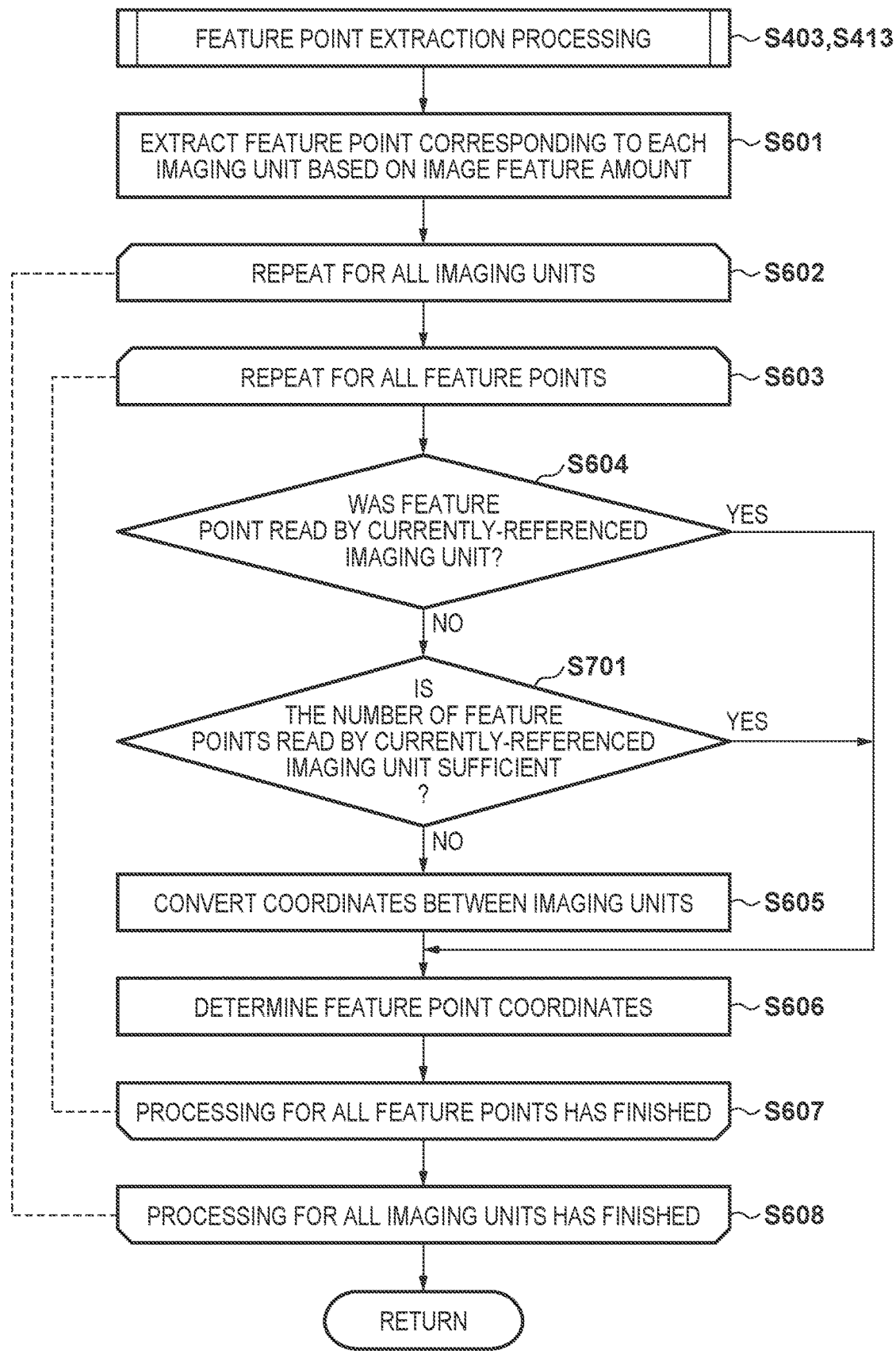
FIG. 7 is a flowchart for describing a process of extracting feature points by the verification apparatus according to a second embodiment.

FIG. 7 is a flowchart for explaining a process of extracting feature points by a verification apparatus 209 according to the second embodiment. The process described in the flowchart is achieved by the CPU 238 of the verification apparatus 109 executing the above-described program deployed in the memory 239. In FIG. 7, the same reference numerals are used for the processes common to those in the above-described FIG. 6, and description thereof will be omitted.

In step S701, the CPU 238 determines whether or not a number of feature points read by the imaging unit are sufficient for calculating the geometrical conversion parameter. If it is determined that the feature points are not sufficient, the process proceeds to step S605 and the coordinate conversion process of the feature points between the imaging units is performed. On the other hand, if it is determined that the number of feature points are sufficient for calculating the geometrical conversion parameter, step S605 is skipped and the process proceeds to step S606. For example, when an affine transformation is used as a geometrical conversion, at least three feature points are required, and when a projective transformation is used, at least four feature points are required. However, the number of feature points is not limited to these, and the number of feature points having a margin for improving the robustness of the parameter calculation may be set as a threshold value. The number of feature points is made as large as possible, and the coordinates of the extracted feature points are made to distribute evenly over the entire sheet. As a result, even if the read image data is partially deformed due to the conveyance of the sheet, it is possible to suppress alignment error. Therefore, this threshold value is determined from the tradeoff between processing speed and alignment accuracy.

As described above, according to the second embodiment, after a number of feature points necessary for geometrical conversion processing for aligning the images are obtained, the coordinate conversion process of the feature points between the imaging units is omitted. As a result, the speed of verification processing per printed sheet can be improved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-211561, filed Dec. 21, 2020, which is hereby incorporated by reference herein in its entirety.

What is claimed is:

1. A verification apparatus operable to (a) read a printed sheet to obtain a scanned image, and (b) perform verification processing for verifying whether there is an image defect in the printed sheet by comparing the scanned image and a correct image, the apparatus comprising:
- a first reader that reads the printed sheet to generate image data;
- a second reader that reads the printed sheet to generate image data, wherein respective items of the image data generated by the first reader and the image data generated by the second reader have an overlapping region in which they overlap; and
- one or more controllers including at least one processor and at least one memory, wherein the one or more controllers are configured to:
- (A) in generation of image data,
- (1) extract feature points of respective items of image data generated by reading the printed sheet with the first reader and image data generated by reading the printed sheet with the second reader;
- (2) determine whether any one of feature points of first image data generated by reading the printed sheet with the first reader corresponds to any one of feature points of second image data that should be generated by reading the printed sheet with the second reader;
- (3) in a case where it is determined in the determining that a first feature point of the feature points of the second image data corresponds to any one of the feature points of the first image data, convert coordinates of the first feature point from a coordinate system of the second reader to a coordinate system of the first reader;
- (4) in a case where it is determined in the determining that a second feature point of the feature points of the second image data does not correspond to any one of the feature points of the first image data, map coordinates of the second feature point on the coordinate system of the first reader; and
- (5) store coordinates of feature points of the second image data in the coordinate system of the first reader, and store the first image data and the second image data as the scanned image or the correct image; and
- (B) in the verification processing,
- (1) calculate a geometrical conversion parameter from (a) the correct image generated in the generation of image data and (b) coordinates of the feature points of the correct image and (c) the coordinates of feature points of the scanned image generated in the generation of image data; and
- (2) align the scanned image and the correct image based on the geometrical conversion parameter, and verify whether there is an image defect in the printed sheet.

2. The verification apparatus according to claim 1, wherein in the aligning of the scanned image data and the correct image, the scanned image and the correct image are aligned using an affine transformation with the geometrical conversion parameter.

3. The verification apparatus according to claim 1, wherein the one or more controllers are further configured to:
- in the verification processing, in a case where a difference for each pixel between the scanned image and the correct image is greater than or equal to a predetermined value, display that the printed sheet is defective.

4. A method of controlling a verification apparatus for (a) reading a printed sheet to obtain a scanned image, and (b) performing verification processing for verifying whether there is an image defect in the printed sheet by comparing the scanned image and a correct image, the method comprising:
- (A) reading the printed sheet to generate image data;
- (B) reading the printed sheet to generate image data, wherein respective items of the image data generated by the first reader and the image data generated by the second reader have an overlapping region in which they overlap;
- (C) in generation of image data:
- (1) extracting feature points of respective items of image data generated by reading the printed sheet with the first reader and image data generated by reading the printed sheet with the second reader;
- (2) determining whether or not each feature point of feature points of first image data generated by reading the printed sheet with the first reader corresponds to any one of feature points of second image data that should be generated by reading the printed sheet with the second reader;
- (3) in a case where it is determined in the determining that a first feature point of the feature points of the second image data corresponds to any one of the feature points of the first image data, converting coordinates of the first feature point from a coordinate system of the second reader to a coordinate system of the first reader;
- (4) in a case where it is determined in the determining that a second feature point of the feature points of the second image data does not correspond to any one of the feature points of the first image data, mapping coordinates of the second feature point on the coordinate system of the first reader; and
- (5) storing coordinates of feature points of the second image data in the coordinate system of the first reader, and storing the first image data and the second image data as the scanned image or the correct image; and
- (D) in the verification processing:
- (1) calculating a geometrical conversion parameter from (a) the correct image generated in the generation of image data and (b) coordinates of the feature points of the correct image and (c) the coordinates of feature points of the scanned image generated in the generation of image data; and
- (2) aligning the scanned image and the correct image based on the geometrical conversion parameter, and verifying whether there is an image defect in the printed sheet.

5. A non-transitory computer-readable storage medium storing a program for causing a processor to execute a method of controlling a verification apparatus for (a) reading a printed sheet to obtain a scanned image, and (b) performing verification processing for verifying whether there is an image defect in the printed sheet by comparing the scanned image and a correct image, the method comprising:
- (A) reading the printed sheet to generate image data;
- (B) reading the printed sheet to generate image data, wherein respective items of the image data generated by the first reader and the image data generated by the second reader have an overlapping region in which they overlap;
- (C) in generation of image data:
- (1) extracting feature points of respective items of image data generated by reading the printed sheet with the first reader and image data generated by reading the printed sheet with the second reader;
- (2) determining whether or not each feature point of feature points of first image data generated by reading the printed sheet with the first reader corresponds to any one of feature points of second image data that should be generated by reading the printed sheet with the second reader;

(3) in a case where it is determined in the determining that a first feature point of the feature points of the second image data corresponds to any one of the feature points of the first image data, converting coordinates of the first feature point from a coordinate system of the second reader to a coordinate system of the first reader;

(4) in a case where it is determined in the determining that a second feature point of the feature points of the second image data does not correspond to any one of the feature points of the first image data, mapping coordinates of the second feature point on the coordinate system of the first reader; and (5) storing coordinates feature points of the second image data in the coordinate system of the first reader, and storing the first image data and the second image data as the scanned image or the correct image; and (D) in the verification processing:

(1) calculating a geometrical conversion parameter from (a) the correct image generated in the generation of image data and (b) coordinates of the feature points of the correct image and (c) the coordinates of feature points of the scanned image generated in the generation of image data; and (2) aligning the scanned image and the correct image based on the geometrical conversion parameter, and verifying whether there is an image defect in the printed sheet.

6. The verification apparatus according to claim 1, wherein the one or more controllers are configured to use another geometrical conversion parameter other than the calculated geometrical conversion parameter in the mapping of the coordinates of the second feature point on the coordinate system of the first reader.

7. The verification apparatus according to claim 1, wherein the another geometrical conversion parameter is generated in advance using a chart image and is stored in the one or more controllers.

* * * * *